United States Patent
Woydt et al.

(12) 
(10) Patent No.: US 6,699,589 B2
(45) Date of Patent: Mar. 2, 2004

(54) CARBON REINFORCEMENTS, IN PARTICULAR FOR USE IN CARBON-FIBER REINFORCED MATERIALS, AND A METHOD OF GENERATING INTERNAL PROTECTION AGAINST OXIDATION IN CARBON REINFORCEMENTS

(76) Inventors: Mathias Woydt, Am Gruenen Hof 2a, D-13465 Berlin (DE); Michael Dogigli, Wacholderweg 12, D-85757 Karlsfeld (DE)

( * ) Notice: Subject to any disclaimer, the term of this patent is extended or adjusted under 35 U.S.C. 154(b) by 69 days.

(21) Appl. No.: 09/982,661

(22) Filed: Oct. 18, 2001

(65) Prior Publication Data

US 2002/0048672 A1 Apr. 25, 2002

(30) Foreign Application Priority Data

Oct. 19, 2000 (DE) .......................................... 100 51 901

(51) Int. Cl.⁷ ............................................... B21D 39/00
(52) U.S. Cl. ........................ 428/614; 428/364; 428/394; 428/367; 428/381; 428/607; 428/634; 428/299.1
(58) Field of Search .................................. 428/614, 634, 428/364, 292, 375, 374, 611, 607, 367, 381, 384, 378, 389, 299.1; 524/609; 525/537

(56) References Cited

FOREIGN PATENT DOCUMENTS

| DE | 44 43 789 | 6/1995 |
|---|---|---|
| DE | 196 16 217 | 4/1996 |

OTHER PUBLICATIONS

D.W. McKee, "Effect of absorbed phosphorus on the oxidation behavior of graphite", Carbon, 1972, vol. 10, pp. 491–497.

*Primary Examiner*—Merrick Dixon
(74) *Attorney, Agent, or Firm*—Reed Smith LLP

(57) ABSTRACT

In carbon reinforcements, in particular when used in carbon-fiber reinforced materials, sulfur-complex forming substances are chemically adsorbed, at least in part, at potential oxidation locations of an hexagonal carbon lattice to provide internal protection against oxidation.

22 Claims, No Drawings

CARBON REINFORCEMENTS, IN PARTICULAR FOR USE IN CARBON-FIBER REINFORCED MATERIALS, AND A METHOD OF GENERATING INTERNAL PROTECTION AGAINST OXIDATION IN CARBON REINFORCEMENTS

CROSS-REFERENCE TO RELATED APPLICATIONS

This application claims priority of German Application 100 51 901.6, filed Oct. 19, 2000, the complete disclosure of which is hereby incorporated by reference.

BACKGROUND OF THE INVENTION a) Field of the Invention

The invention relates to carbon reinforcements, in particular for use in carbon-reinforced materials, and to a method of generating internal protection against oxidation in carbon reinforcements.

b) Description of the Related Art

Carbon reinforcements are currently used in many materials, use being made e.g. of whiskers and carbon fibers. Carbon fibers, also known as coal fibers, are thin fibers of pure carbon, embedded in plastics, metals and glass for reinforcement thereof. This yields high-strength materials, such as e.g. carbon-fiber reinforced plastics (KFK).

Carbon-reinforced materials are used, among others, in particular in aircraft construction and in space technology, and in many cases in the form of carbon-reinforced silicon carbide materials. In these materials, carbon reinforcements, and in particular carbon fibers, are incorporated in a silicon carbide matrix. In contrast to monolithic silicon carbide, carbon-reinforced silicon carbide materials are more elastic, due to the embedded C fibers, and tolerate more damage in terms of their rupture behavior.

The carbon-reinforced silicon carbide materials, which have only a very low specific weight and are also known as C/SiC materials, are used predominantly at high temperatures, in particular in combination with light-weight designs in aircraft construction, and, in this connection, very often in re-entry technology.

A problem has been encountered in connection with C/SiC-materials in that they degrade at temperatures of from about 500° C. by oxidation of the carbon reinforcements, in particular at the silicon carbide matrix/carbon reinforcement interface as well as at those locations where the carbon reinforcement is not protected by the SiC matrix, e.g. at the material surface. Said oxidation, also referred to as "fiber burn off" in connection with the use of carbon fibers for reinforcement, leads to a significant deterioration of the properties of the material, e.g. its strength.

It has hitherto been known, in practice, to suppress oxidation of the carbon or C reinforcements in materials, e.g. by coating C/SiC materials on the outer surfaces with a β-SiC coating by means of a CVD method. However, thermal or mechanical stresses cause cracking in such a β-SiC layer, allowing the oxidizing gas to freely enter the material and thus also the C reinforcement. Thus, once such cracks have formed, undesirable oxidation of the C reinforcement may occur again.

The published German patent application DE 44 43 789 describes a further external anti-oxidation coating for carbon composite materials. Said anti-oxidation coating is provided such that it consists of hafnium-containing aluminum borosilicate glass comprising a boron-containing filler material and/or high melting point SiC or $Si_3N_4$ filler materials, which may be applied on an SiC surface to be coated.

Up to about 1600° C., said coating shows continuous, thermoviscous plastic behavior and thus "seals" any cracks formed in the SiC coating. The low oxygen permeation through said coating is obtained by silicium-containing boron compounds, which allow dissolved oxygen to be bound while forming $SiO_2$ and $B_2O_3$, and thus have a so-called "oxygen getter function".

However, said thermoviscous coatings are disadvantageous in that they solidify upon cooling while, in turn, forming cracks again. Thus, if there are no more "oxygen getters" present upon binding of all boron compounds, the oxidizing gases may penetrate again through the cracks thus formed to the C reinforcement, consequently causing an undesired oxidation, which leads to a considerable deterioration of the material.

According to DE 196 16 217 C2, an increase in the functionality of an external anti-oxidation coating may be obtained such that said protection coating contains refractory ceramic powder particles having a degree of emission of at least 0.70, and that, by incorporating compounds having the general elemental composition of $Me_xB_z$, wherein Me is Si, Al, Zr, Hf or Y, and x and y each represent a number from 1 to 6, a vitreous-amorphous phase of the general type $Me_2O_3$—$MeO_2$—$B_2O_3$ is formed during a short heating period.

In an oxidation protection coating as described in said document, the refractory ceramic powder particles may form a disperse substance component, and thus the mechanothermally stabilizing structure of a protective coating as well as the compound $Me_xB_z$ may form the thermoviscous matrix component which functions as the in situ-binding phase for the stabilizing structure consisting of ceramic particles. This means that, in this case too, a coating is formed as an oxidation protection layer.

It is known that future re-entry aircraft to be used in space flight will be provided with novel control surfaces formed entirely of a C/SiC material and, moreover, being re-usable. In addition to immobile structural elements, such control surfaces also contain mobile elements, such as e.g. sliding bearings, whose contact surfaces can not be provided with thermoviscous layers, since said contact surfaces are subject to wear and thus can hardly be permanently protected on the outside with the help of a protective coating against oxidation, since such coating will be worn off first due to wear. This also applies to re-usable screw connections made of a C/SiC material, which are indispensible in the construction of large control surfaces on re-entry aircraft.

Further, thermo-viscous layers for protection against oxidation are generally inadmissible in a tribological system, since they solidify upon cooling and permanently connect the surfaces with each.

It is known from D. W. McKee, "Effect of absorbed phosphorus on the oxidation behavior of graphite", Cabon, 1972, Vol. 10, pp. 491–497, to effect oxidation protection of carbons by infiltrating them with aluminum phosphate or with $POCl_3$. The mechanism involved therein is believed to be the chemical adsorption on the semi-crystal layers of the carbon lattice.

However, these so-called impregnating tests with aluminum phosphate or $POCl_3$ are permanently effective only up to about 1000° C. due to the tendency of phosphates to decompose at elevated temperatures, so that, at elevated operating temperatures, such as those found, e.g., in re-entry technology of aircraft, no permanent oxidation protection can be obtained by said infiltration of carbons.

OBJECT AND SUMMARY OF THE INVENTION

Thus, it is a primary object of the present invention to provide carbon reinforcements, in particular for use in a carbon-reinforced silicon carbide material, which are oxidation-resistant up to high temperatures, even if subjected to tribological stresses.

According to the invention, this object is achieved in carbon reinforcements, in particular those for use in carbon-reinforced materials, by sulfur complex-forming substances being chemically adsorbed, at least in part, at potential oxidation locations of an hexagonal carbon lattice in the carbon reinforcements for internal oxidation protection.

Carbon usually reacts with oxidizing gases, such as e.g. oxygen or carbon dioxide contained in the air, to form CO and $CO_2$. However, such oxidation is undesirable since it causes a marked deterioration of material properties.

For carbon reinforcements, carbon is used in its graphite modification, which has an hexagonal crystal structure, wherein the hexagonal base layers are arranged in layers perpendicular to one another in the sequence . . . ABAB . . . Within said base layers, the atoms are covalently bound and the Van-der-Waals bond determines cohesion between the base layers in a vertical direction.

The reaction of the carbon with said oxidizing gases preferably takes place at potential oxidation locations, i.e. at the ends of the so-called prism surfaces of the hexagonal carbon lattice, the planes perpendicular to the basal plane, or at defects, such as holes, point defects, or end points of edge dislocations and screw dislocations, in the basal plane.

These locations serve as so-called active locations for the oxidation reaction, since at the edges thus formed, known as semi-crystal layers, the carbon atoms have free, covalent bonds at the edges thus formed, known as semi-crystal layers. The points of intersection of the dislocation lines in the basal plane form two-dimensional reaction nuclei. However, a smooth basal plane free from point defects and dislocations cannot oxidize.

However, since carbon reinforcements obtain their strength or their high E-module only by a substantial disarrangement of the crystal lattice, the hexagonal layers are inevitably present as lamellae which are three-dimensionally interlaced at will. Such a structure inevitably generates prism surfaces, which then serve, as mentioned above, as oxidation locations.

Thus, if sulfur-complex forming substances are chemically adsorbed, at least in part, at potential oxidation locations, such as in particular the prism surfaces of an hexagonal carbon lattice, as required according to the invention, the oxidation rate of the carbon at high temperatures of about 1600° C. may be substantially reduced, since the oxidation reaction can be prevented by the sulfur complexes forming the terminal group of a basal plane and thus no longer being available for any potential oxidation.

Up to the decomposition temperature of the covalently bound sulfur complexes, which is above 1600° C., chemical attack on the carbon reinforcements, in particular in a carbon-fiber reinforced Si/C material, can thus be excluded.

According to the invention, carbon reinforcements, in particular for use in a C/SiC material, are provided, wherein a principle is used on the atomic level, according to which potential oxidation locations are "saturated". This allows obtaining materials having a substantially improved life span, even in an elevated temperature range, which are also re-usable.

Allowing oxidation protection to take place on an atomic level further ensures that parts subject to wear will also be permanently protected against oxidation because the oxidation protection is provided not only at the material surface.

Preferably, as many potential oxidation locations as possible should be saturated by sulfur complexes, thus allowing an oxidation reaction of the carbon reinforcements to be considerably reduced throughout the material by chemical adsorption.

The sulfur complexes formed by chemical adsorption, or CS-complexes, are stable, covalently bound complexes preventing a chemical attack on the material or on a composite material.

Since the sulfur or CS-complexes are released again from the semi-crystal layers at the elevated operating temperatures of above 1600° C. envisaged for the carbon fibers, it may be envisaged according to a preferred embodiment of the present invention to further incorporate inorganic sulfur carriers between the basal layers of the carbon lattice in addition to the chemically adsorbed sulfur complexes.

Such incorporated inorganic sulfur carriers thus serve to supplement the chemically adsorbed sulfur complexes, allowing newly formed semi-crystal layers to be saturated again with the help of said sulfur carriers. Thus, the CS-complexes chemically adsorbed to the material might be regarded as so-called "inhibitors" of the potential oxidation locations and the inorganic sulfur carriers as an "inhibition reserve" for newly forming, potential oxidation locations. Said inorganic sulfur carriers are activated once the decomposition temperatures of the individual inorganic sulfur carriers selected are exceeded in the structural element.

Suitable inorganic sulfur carriers include in particular sulfates, such as $NiSO_4$, $Al_2(SO_4)_3$, sulfites and/or sulfides, and among them preferably those which only split off sulfur, so that $SO_2$ is produced at temperatures of from about 1000° C. to 1200° C. in air or in another oxidizing environment.

For example, it has been found that pyrite ($Fe_2S$) which splits off a sulfur atom at 700° C. and above, while the remaining FeS is stable up to far more than 1600° C. and thus also forms a sulfur carrier up to high temperatures, is particularly suitable for use as an inorganic sulfur carrier.

This also applies to CuS, which splits off a sulfur atom at 1100° C. and above, while the remaining $Cu_2S$ is thermally stable up to far more than 2000° C. $TiS_2$ also separates off a sulfur atom at 1500° C. and above, while the remaining TiS is thermally stable up to far more than 2100° C.

It has turned out that the amount of intercalary inorganic sulfur carriers should preferably not exceed 5% by weight, because otherwise the properties of the carbon reinforcment may possibly be affected.

All semi-crystal layers of the carbon reinforcements, preferably also those at the prism surfaces inside the fibers, should have been saturated by chemical adsorption already before any oxidation stress.

In order to keep the sulfur concentration in the carbon reinforcements as low as possible, it would be favorable if the crystal-size of the carbon reinforcements were as large as possible, since the size of the prism surfaces decreases as the crystal size increases, and thus also as the specific surface area of the carbon reinforcements decreases, so that fewer sulfur complexes need to be chemically adsorbed in the case of a larger crystal size in order to achieve substantially complete saturation of the potential oxidation locations.

In general, use is made of carbon reinforcements in the form of fibers allowing, in particular, a marked increase in material strength, e.g. of a C/SiC materials.

Moreover, the invention also relates to a method of generating internal protection against oxidation in carbon reinforcements, in particular for use in a carbon-reinforced silicon carbide material, which method preferably enables the preparation of carbon reinforcements as described above, wherein, according to the invention, stable sulfur surface complexes are chemically adsorbed, at least in part, at potential oxidation locations in the carbon reinforcements.

Carbon-sulfur complexes, also referred to below simply as CS-complexes, are usually formed as sulfide or hydrosulfide compounds by atomic chemical adsorption of sulfur on carbon reinforcements in the presence of sulfur vapor, $H_2S$, $CS_2$ or $SO_2$. It has been found to be particularly advantageous, if the chemical adsorption takes place in such a manner that a precursor material doped with sulfurous compounds is used already in preparing the carbon reinforcements. However, in addition it is also envisaged that the CS complexes may be attached to the potential oxidation locations only upon the pyrolysis of the precursor material, during which the carbon reinforcements are formed, by subsequent chemical adsorption. Thus, the already pyrolized carbon reinforcements may be chemically adsorbed in a reactor, at a fiber temperature of from 300 to 700° C. and at a pressure below 0.26 bar in the presence of sulfur vapor, $H_2S$, $CS_2$.

Depending on the temperature and specific surface area of the material, the reaction time of the chemical adsorption and/or the cumulated retention time in the reaction zone required for complete saturation of the semi-crystal layers is from 15 min to 7 h.

In general, this procedure is preferably carried out such that all potential oxidation loactions are saturated. Such a condition can most simply be assured using gaseous agents.

Upon such treatment, the inhibited carbon reinforcements in the evacuated reactor are heated at a temperature ranging from 444° C. to 800° C., preferably at 700 ° C., using sulfur-free gas, for less than 30 minutes, in order to remove excess sulfur and physically adsorbed sulfur, which would otherwise evaporate spontaneously upon the first heating of the finished component later on.

For industrial processing engineering, it may be required to subsequently add a second treatment cycle in order to saturate the freed semi-crystal layers of the desorbed sulfur once again.

Since transition metals, such as iridium, rhodium, iron, cobalt, copper and nickel, catalyze the oxidation reaction of carbon, an increased resistance to oxidation of the carbon reinforcements may be achieved simply by ensuring that the precursors are free from said elements. However, in contrast thereto, the presence of aluminum, zinc and tin has proved to be harmless.

According to a particularly preferred embodiment of the invention, a precursor material substantially doped with sulfurous compounds, advantageously consisting of polyacrylonitriles doped with sulfurous compounds, is used to prepare the carbon reinforcements.

Nowadays, the preparation of carbon reinforcements and, in particular, of carbon fibers is frequently carried out, as known to those skilled in the art, on the basis of a PAN precursor. A PAN precursor is defined as a polyacrylonitrile fiber precursor, i.e. a substance of high molecular weight, formed by polymerisation of acrylonitrile and having the general formula $[-CH_2-CH(CN)-]_n$.

Moreover, the precursor material may essentially be formed also from mesophase precursors doped with sulfurous compounds.

The carbon reinforcements may also be prepared from what is known as coal-tar pitch, petroleum pitch or mesophase pitch.

The precursor material, whether doped with sulfurous compounds or not, is pyrolized to form the carbon reinforcements in a manner known per se, such pyrolysis preferably being carried out at a temperature in the range of from 700 to 1000° C.

According to a preferred embodiment of the method according to the invention, the precursor material, prior to a pyrolysis forming the carbon reinforcements, may also contain inorganic sulfur carriers, in addition to the above-described doping elements, which carriers are incorporated in the graphite crystals as an "inhibition reserve" as a result of pyrolysis.

Strictly speaking, the inorganic sulfur carriers can only be intercalated on an atomic level between the basal surfaces. Since the main purpose of the sulfur carriers consists in subsequently supplying sulfur, these may, however, also be present in the form of particles which decompose. These particles are added to the precursor prior to its pyrolysis, to which end the sulfur carriers need to be thermally stable, in any case, up to 1000° C.

However, it is also possible to saturate the carbon reinforcements with inorganic sulfur carriers only upon pyrolysis and chemical adsorption during a heat treatment following the preparation process.

Basically, inorganic sulfur carriers may include sulfates, sulfites and/or sulfides, among which $NiSO_4$, $Al_2(SO_4)_3$ and in particular $Fe_2S$, $CuS$ and/or $TiS_2$ are particularly preferred.

What has been said above with regard to the precursors also applies to the inorganic sulfur carriers, namely that, again, they should not contain any iridium, rhodium, iron, cobalt, copper and nickel.

Another aspect of the invention is the specific use of the carbon reinforcements according to the invention, in particular in SiC materials or in carbon materials. Examples of these include semi coke and/or mesophase powder having self-sintering properties, electrographite, hard-burnt coal, fine-grain graphite and mesophase carbons obtained from coal-tar pitch or petroleum pitch.

The carbon reinforcements according to the invention exhibit good properties, in particular when used at temperatures above 1,500° C.

Preferably, such carbon reinforcements are used in re-entry technology, also in turbine construction, such as e.g. for combustion chambers and turbine blades, and in pistons for combustion engines.

The method according to the invention will be explained below in more detail with reference to a preferred exemplary embodiment.

DESCRIPTION OF A PREFERRED EXEMPLARY EMBODIMENT

First, carbon fibers are produced in a manner known to any person skilled in the art, i.e. starting out from a PAN precursor, they are pyrolized at a temperature of about 900° C. It is important that the PAN precursor should be free from iridium, rhodium, iron, cobalt, copper and nickel.

Upon pyrolysis of the carbon fibers, a separate chemical adsorption is carried out following said pyrolysis. The chemically adsorbed CS complexes located at the potential oxidation locations are formed by adding the carbon fibers to a heatable, evacuable reactor from which the gas mixture present in said reactor is pumped out before. The chemical adsorption reaction is then carried out for 2 hours in sulfur vapor at a fiber temperature of about 600° C. and at a pressure of about 0.2 bar. The amount of chemically adsorbed sulfur depends on the crystal size of the carbon reinforcements. Since the size of the prism surfaces decreases as crystal size increases, fewer sulfur complexes need to be chemically adsorbed to achieve a substantially complete saturation of the potential oxidation locations in carbon reinforcements having a large crystal size.

Next, the inhibited fibers are heated at 700° C. for less than 30 minutes without sulfur vapor to remove excessive and physically adsorbed sulfur. Then, the carbon fibers thus obtained are subjected to a further treatment to provide what is called an "inhibition reserve" in the carbon fibers. To this end, the carbon fibers are passed into a heating zone contained in an evacuable reactor, wherein heating is carried out by means of an induction heating means, but could also be effected by quartz lamps or a resistance heating means. The reactor contains a vessel for evaporating sulfur.

The fibers, coming from a coil, now pass through the heating or reaction zone and are then wound up again.

This procedure is reversely repeated at least once.

In an alternative embodiment, the fibers may also be endlessly wound up on two rolls and then continuously pass through the heating zone in a loop.

As mentioned above, the carbon reinforcements according to the invention, which may be produced e.g. by a method according to the invention, have proven advantageous in particular for use in C/SiC materials at elevated temperatures of about 1600° C. or more.

Thus, such carbon reinforcements are particularly useful in C/SiC materials employed in re-entry technology.

While the foregoing description and drawings represent the present invention, it will be obvious to those skilled in the art that various changes may be made therein without departing from the true spirit and scope of the present invention.

What is claimed is:

1. Carbon reinforcements, in particular for use in carbon-reinforced materials, comprising sulfur-complex forming substances which are chemically adsorbed in said carbon reinforcements for internal oxidation protection, at least in part, at potential oxidation locations of an hexagonal carbon lattice.

2. Carbon reinforcements as claimed in claim 1, wherein, in the carbon lattice, inorganic sulfur carriers are incorporated, at least in part, between basal layers.

3. Carbon reinforcements as claimed in claim 2, wherein the inorganic sulfur carriers are sulfides, sulfites and/or sulfates.

4. Carbon reinforcements as claimed in claim 2, wherein said inorganic sulfur carriers are $NiSO_4$, $Al_2(SO_4)_3$, $Fe_2S$, CuS and/or $TiS_2$.

5. Carbon reinforcements as claimed in claim 2, wherein the amount of intercalary, inorganic sulfur carriers does not exceed 5% by weight.

6. Carbon reinforcements as claimed in claim 1, wherein the crystal size of said carbon reinforcements is as large as possible.

7. Carbon reinforcements as claimed in claim 1, wherein said carbon reinforcements are fibers.

8. In a method of producing an internal oxidation protection for carbon reinforcements as claimed in claim 1, including the step of allowing stable sulfur complexes to be chemically adsorbed, at least in part, at potential oxidation locations of the carbon reinforcements.

9. The method as claimed in claim 8, wherein, upon said chemical adsorption, heating the carbon reinforcements at a temperature in the range of from 444° C. to 800° C. for less than 30 minutes in an inert atmosphere.

10. The method as claimed in claim 8, wherein said chemical adsorption is effected by using a precursor material doped with sulfurous compounds to prepare the carbon reinforcements.

11. The method as claimed in claim 10, wherein the precursor material is essentially free from iridium, rhodium, iron, cobalt, copper and/or nickel.

12. The method as claimed in claim 10, wherein the precursor material is formed essentially from polyacrylonitriles doped with sulfurous compounds.

13. The method as claimed in claim 10, wherein the precursor material is essentially formed from mesophase-precursors doped with sulfurous compounds.

14. The method as claimed in claim 10, wherein the precursor material is pyrolyzed to form the carbon reinforcements.

15. The method as claimed in claim 12, wherein said pyrolysis is conducted at a fiber temperature in the range of from 700 to 1000° C.

16. The method as claimed in claim 8, wherein, prior to said pyrolysis, the precursor material comprises inorganic sulfur carriers for carbon reinforcement.

17. The method as claimed in claim 8, wherein upon said pyrolysis the carbon reinforcements are enriched with inorganic sulfur carriers by heat treatment.

18. The method as claimed in claim 16, wherein said inorganic sulfur carriers are sulfides, sulfites and/or sulfates.

19. The method as claimed in claim 14, wherein said inorganic sulfur carriers are $NiSO_4$, $Al_2(SO_4)_3$, $Fe_2S$, CuS and/or $TiS_2$.

20. In a method of using the carbon reinforcements as claimed in claim 1 including the step of using the carbon reinforcements in carbon-fiber reinforced SiC- and/or carbon materials.

21. In a method of using the carbon reinforcements as claimed in claim 1 including the step of using the carbon reinforcements at temperatures above 1500° C.

22. In a method of using the carbon reinforcements as claimed in claim 1 including the step of using the carbon reinforcements in re-entry technology, in turbine construction and/or in piston construction.

* * * * *